Sept. 6, 1927.
W. A. HEYMAN ET AL
1,641,429
CONTINUOUS FREEZING APPARATUS
Filed May 5, 1922
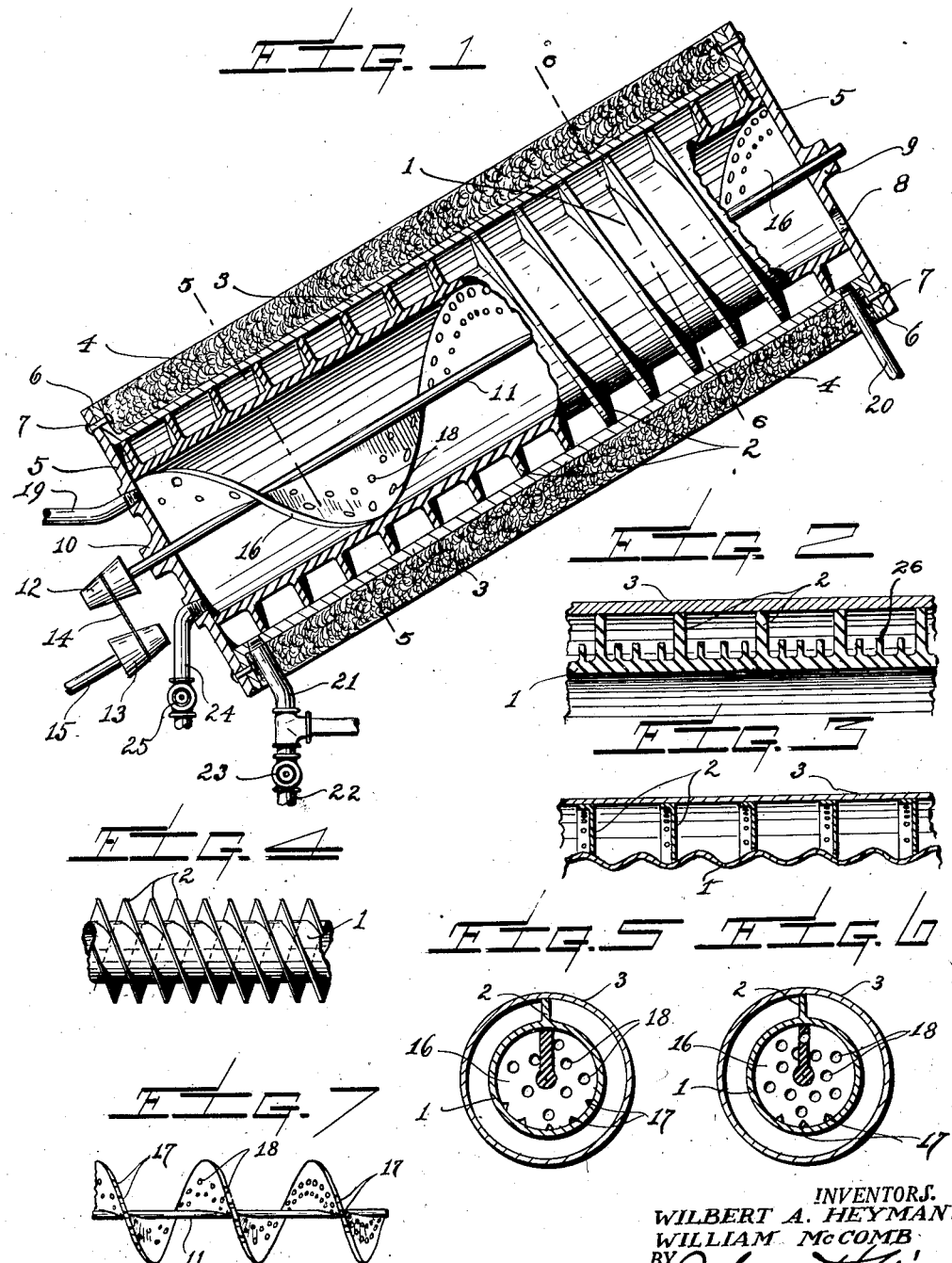
INVENTORS.
WILBERT A. HEYMAN &
WILLIAM McCOMB
BY
ATTORNEY.

Patented Sept. 6, 1927.

1,641,429

UNITED STATES PATENT OFFICE.

WILBERT A. HEYMAN AND WILLIAM McCOMB, OF NEW YORK, N. Y.

CONTINUOUS-FREEZING APPARATUS.

Application filed May 5, 1922. Serial No. 558,573.

This invention relates to the concentration of fruit juices, by means of which the bulk of such juices may be greatly reduced, while at the same time preserving the desirable ingredients in their original condition.

More specifically, this invention has to do with apparatus by means of which the concentration may be continuously carried on, the process depending essentially on the principle of concentration by freezing, whereby the water is congealed and the ice so formed may be readily removed, the remaining liquid containing the solid material and dissolved substances in a high degree of concentration.

It will be understood that in the treatment of fruit juices to place them in condition for indefinite preservation, it is not only desirable that the bulk of such juices be diminished as greatly as possible for greater facility in storage and shipment, but it is necessary that the concentration process be carried on in such a way as to keep the juices from contamination in so far as possible. It is well known, of course, that the extracted juices secured by crushing or otherwise treating the fruit becomes quickly infected with bacteria which, allowed to remain active, would produce fermentation and chemical changes under ordinary circumstances. The chemical action so resulting breaks down or otherwise destroys the delicate flavoring principles, which consisting of aldehydes, esters, ketones and other substances of a similar organic character, thereby rendering the juices less desirable for use. Furthermore, the sugar content is sometimes partially reduced, with the production of alcohols and acids whereby not only is the taste altered, but the juice becomes otherwise unfit, or undesirable for consumption.

Having these considerations in mind, we have found that the well known processes of concentration, based on the principle of freezing may be best carried on in the absence of air, or by maintaining the juice in an atmosphere of inert gas, whereby the fruit ferments are prevented from becoming active and contaminating substances ordinarily present in the atmosphere are prevented from coming in contact with the juice under treatment.

In the apparatus which forms the subject matter of the present invention, the juices are introduced in the absence of atmospheric air, either preventing this contact by mechanical means, or by displacing or replacing the atmospheric air by means of inert gas, such as carbon-dioxide or nitrogen. It is immaterial, so far as this apparatus is concerned, whether or not the juices have been Pasteurized or sterilized and clarified before treatment in the freezing apparatus, since these processes may be readily carried on either before or after the concentration, or in some cases omitted entirely.

In the present system and apparatus by which the concentration is carried on, making use of the freezing principle, it has been necessary to consume large periods of time in order to secure the desired concentration. It will be clear that were the ordinary freezing methods used, such as are employed in the case of making ice, the blocks of ice so formed adhering to the sides of the container act as insulation, and it becomes necessary to continue the freezing for a long time before the desired concentration is reached.

One object of this invention, therefore, is to provide a simple apparatus for concentration by freezing, which may be continuously operated, and in which the variable factors may be so controlled as to determine the concentration to be produced.

Another object of the invention is to provide a simple and effective apparatus which may be continuously operated, which requires a minimum of attention, and which produces a product from which the water, as ice, may be readily separated by mechanical means.

Another object of the invention is to provide a new and improved continuous freezing apparatus for concentration purposes, by means of which the degree of concentration may be varied within relatively wide limits, the apparatus requiring a minimum of attention, and being capable of regulation, so that a high output may be maintained.

Another object of the invention is to provide a new and improved apparatus for concentration based on the freezing principle, the apparatus being capable of continuous operation so that the juices may be introduced in a steady flow, the water being congealed into ice crystals and carried out of the machine so that separation of the water and concentrated juice may be readily and easily performed.

Another object of this invention is to provide a new and improved freezing apparatus for concentration purposes which may be continuously operated, and in which the liquid to be congealed is kept from contact with the air until the freezing process has been completed.

Another object of the invention is to provide a new and improved process for concentration based on the freezing principle, the apparatus being capable of continuous action and being so designed that the desired concentration by freezing is accomplished in a short interval of time whereby the possibility of contamination and of the introduction of bacteria from the atmosphere is greatly lessened, and any possibility of bacteria action substantially eliminated.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

With reference now to the drawings wherein we have shown a preferred form of embodiment of our invention;

Figure 1 represents a longitudinal, cross-sectional view of our freezing apparatus, parts being broken away so that the construction may be more clearly seen.

Figure 2 is a cross-sectional view in detail showing the fins on the freezing cooler.

Figure 3 is a view similar to Figure 2, but showing a slightly different form of fin construction.

Figure 4 is a view in detail showing the fin construction and illustrating the path of travel of the cooling medium.

Figure 5 is a view of the propelling means taken on the line 5—5 of Figure 1.

Figure 6 is a view similar to Figure 5 taken on the line 6—6 of Figure 1; and

Figure 7 is a view of the propelling means and side elevation showing the ice scrapers formed on the edges thereof.

With reference now to drawings in which similar reference characters indicate similar parts throughout the various views thereof, the reference character 1 designates the freezing chamber here shown to be a cylindrical vessel of considerable length, provided exteriorly with fins 2, to provide greater radiating surface. As shown in Figures 1 to 4 inclusive, these radiating fins may be of various forms of construction, preferably designed, however, so as to conduct the cooling medium in a helical path about the container so that the flow may be directed to all parts of the container without possibility of trapping or by-passing.

The cylindrical chamber is preferably formed of any metal that will not be attacked by fruit acids, although any metal may be used, the surfaces of which are enameled. As will be noted in the drawings, this chamber is to be supported in an inclined position on any suitable supports.

Surrounding the cylinder is a tubular encasing jacket 3, which may be made of any suitable material not necessarily of the material of which the cylinder itself is formed, this jacket being of such form as to lie closely in contact with the peripheral edges of the fins so that there will be no opportunity for the cooling medium to escape from the edges of the fins, rather than passing about the freezing cylinder.

Over the enclosing jacket there is to be placed a coating 4, of any suitable insulating substance such as asbestos, magnesia, or any similar material. Mounted on either end of the cylinder are heads 5, designed to make a close contact with the inner cylinder and to be clamped to a flange, 6, extending laterally from the edges of the jacket by means of bolts 7, or any other clamping means as desired. One of these heads, 5, is provided with an outlet 8, whereby the frozen product may be forced from the chamber at the conclusion of the freezing treatment.

Mounted in suitable bearings 9 and 10 in the heads is a shaft 11 provided at its rear end with a cone pulley 12, which may be driven from a similar cone 13 by a belt 14 in the usual manner, the cone 13 being mounted on a shaft 15 driven from any desired source of power. The shaft 11 has mounted upon it a screw 16, which forms the propelling means by which the juice is forced through the freezing apparatus, this screw 16 being of the type commonly known as the "Archimedean" screw.

The screw 16 is of such form that its marginal edges will lie close to the inner wall of the freezing chamber and is provided with peripheral notches 17 indicated in Figures 5 and 7. The screw is also provided with a plurality of apertures 18. The design of the screw is such that at the driving end there is a relatively small number of notches and apertures, these notches and apertures increasing throughout the length of the screw so that at the exit end there are a great many perforations. The purpose of this arrangement will be later described.

It will be noted that the freezing apparatus is to be mounted in an inclined position, preferably at an angle of approximately thirty degrees, the driving end being in the lower position. The juice or other material to be concentrated is introduced into the freezing chamber by means of a conduit 19 which passes through the water jacket at the lower end and connects with the interior of the freezing chamber proper. The cooling medium is introduced into the jacket through a conduit 20, this conduit entering the jacket near the exit end so that the fresh cooling medium is introduced and comes in contact with that portion of the wall of the chamber where the greatest freezing effect has taken place, it being understood that as the juice becomes more concentrated, the freezing point is lowered, thereby necessitating a lower temperature in order to cause further concentration.

The cooling medium passes out of the jacket through a conduit 21 situated near the lower end of the apparatus and there are also provided draw-off conduits 22 with a valve 23 in order to make it possible to clean the jacket, together with a conduit 24 provided with a valve 25 by which any highly concentrated juice may be removed from the chamber itself in the event that it becomes desirable to clean the interior of the chamber and remove any juice that may possibly have settled in the lower end.

With reference now to Figures 2, 3 and 4, it will be seen, as has been previously stated, that the cooling fins traverse the length of the container in a helical path and may be designed, as shown in Figure 1, so that the medium will make a great many turns throughout the container. In Figure 2 it will be seen that there are a plurality of fins 26 which serve for conducting purposes but which do not guide the travel of the cooling medium. This gives the effect of a large cooling surface, but causes the medium to pass from one end to the other of the chamber in a helix of greater pitch.

In Figure 3 there is shown a fin construction in which the fins 27 are formed as separate elements which may be fastened in place on the outer surface of the chamber in any desired manner. In such a construction as this, it will be possible to construct the chamber of one material and the fins of another, thereby not limiting the manufacture of the cylinder to metals having high conducting properties.

The operation of the apparatus is as follows: With the power thrown on, and the Archimedean screw or helix revolving at a low rate of speed, the cooling medium is introduced through the conduit 20. This medium may be brine or may be some gas as ammonia under pressure, the expansion of which would effectually lower the temperature within the freezing cylinder. When the medium has circulated so as to lower the temperature of the chamber to the desired point, an operation which requires only a short interval of time, the juice to be treated is introduced into the chamber at its lower end through the conduit 19, being led into the chamber at such a rate that it will gradually fill the chamber. As the juice, which ordinarily contains a high percentage of water, comes into contact with the cold walls, the water contained therein will freeze and the ice crystals so formed are broken from the wall by the revolution of the screw, the peripheral notches, 17, aiding in this operation. As the action of the apparatus continues, the screw will carry with it a quantity of ice crystals intimately associated with the juice, these crystals being prevented from assuming a large size by the continued action of the screw. As the screw revolves, it will be understood, of course, that the liquid remaining after the ice is formed will pass through the perforations 18, the ice being carried forward by the screw, the liquid remaining behind. As the ice is carried by the action of the screw toward the upper end of the chamber, it is clear that in order to keep the sides of the container free, a large number of crystals having been formed, it becomes necessary to increase the number of peripheral notches and also the number of perforations in order that these apertures may not be entirely clogged by the crystals.

As the various operations continue, eventually there will be forced through the outlet 8 a mass of ice crystals, to which a quantity of juice will adhere, the combined product being in the form of a slush and being removed from the outlet 8 and placed in suitable containers. This slush will then be carried to centrifugal machines or whizzers of the usual type, and upon treatment in such machines, the adhering juice will be thrown clear while the ice remains in the basket of the machine. If desired, the ice may be crushed and again treated.

It will be seen that the apparatus here disclosed provides means for the continuous concentration of the liquid and by regulating the rate of flow of the liquid into the chamber, the temperature and rate of flow of the cooling medium, the inclination of the chamber and the rate of revolution of the screw will determine the concentration of the juice produced.

Obviously, if the juice is passing slowly into the machine, and the cooling medium introduced into the jacket at a rapid rate, it will be possible to freeze a larger percentage of the water than if the reverse conditions obtained. The regulation of these above factors is, of course, a matter of discretion and will be determined by the purposes for which the treatment is carried on.

The machine has a number of distinct advantages, among others being that by reason of the continuous agitation due to the screw, large crystals of ice are prevented from being formed. This prevents any acclusion of juice within the body of the crystals, and furthermore, by reason of the larger surface exposed, makes it possible to convey a large quantity of the juice from the machine by adherence to the crystals. Furthermore, the production of a slush makes the separation of the ice and the juice very simple, this operation being carried on in a machine which is a standard product.

It will be seen that the freezing operation is carried on without exposure of the liquid to the air, and furthermore, we have found it possible and even preferable in some cases to provide an inlet into the lower end of the jacket by means of which an inert gas such as carbon-dioxide my be introduced into the chamber, thereby displacing any air which might accidentally enter. By reason of the design of the fins, it is possible to expose a large area to the action of the cooling medium, and it is also possible to regulate the rate at which the medium passes from one end of the chamber to the other, regardless of the rate at which it is introduced.

We have found that, under ordinary circumstances, the liquid will be carried off in sufficiently large quantities with the small ice crystals, but if it should happen that a quantity of highly concentrated juice should settle in the lower end of the cylinder, this would be readily drawn off through the conduit 24. All the parts with which the juice comes in contact may be easily kept in a thoroughly hygienic condition, and the apparatus is capable of use continuously to produce a high degree of concentration.

As many changes could be made in this construction without departing from the scope of the following claims, it is intended that all matter contained in the above description or shown in the accompanying drawing shall be interpreted as illustrative only and not in a limiting sense.

What we claim and desire to secure by Letters Patent is:

1. In an apparatus of the class described, a chamber having conducting fins disposed on the exterior surface thereof, a jacket surrounding said fins, means to cause a cooling medium to traverse said chamber in a helical path within said jacket, and a continuously rotated screw mounted within said chamber and having its peripheral edges lying closely adjacent to the inner walls thereof, said screw being perforated throughout its length, the number of said perforations increasing from the inlet to the outlet end of said chamber.

2. In an apparatus of the class described, the combination of a cylindrical chamber disposed in an inclined position, an inlet conduit in the lower end thereof, an outlet conduit in the upper end thereof, a plurality of conducting fins mounted on the exterior surface of said chamber, a jacket enclosing said chamber and lying in intimate contact with said fins, means to cause a cooling medium to traverse the length of said chamber within said jacket in a helical path, heads on either end of said chamber, a continuously rotated shaft mounted in said heads, and a perforated screw on said shaft having its peripheral edge lying closely adjacent to the inner walls of said chamber, said peripheral edge being notched and said perforations and said notches increasing in number from the inlet to the outlet end of said chamber.

3. In apparatus of the class described, a cylindrical chamber mounted in an inclined position and having a plurality of helically disposed fins on the surface thereof, an insulated jacket enclosing said chamber, means to introduce a liquid into the lower end of said chamber, means to introduce a cooling medium within said jacket, heads on said chamber, the upper of said heads being provided with an outlet aperture, a driven shaft journalled in said heads, a screw mounted on said shaft, and so constructed and arranged as to propel the liquid from the lower to the upper end of said chamber and being provided with an increasing number of perforations throughout its length and alternative outlet means in the lower end of said chamber.

4. In a device of the class described, the combination with a cylindrical chamber having conducting fins helically disposed on the external surface thereof, a jacket surrounding and in intimate contact with the edges of said fins, means to introduce a liquid into the lower end of said chamber, means to introduce a cooling medium within said jacket, heads on said chamber provided with outlets, a shaft journalled in said heads, and a screw mounted on said shaft, and adapted to be continuously rotated therewith, said screw having a plurality of perforations and marginal indentations increasing in number from the inlet to the outlet end of said chamber, and being so constructed and arranged as to propel the liquid from the lower to the upper end of said chamber.

In testimony whereof, we affix our signatures.

WILBERT A. HEYMAN.
WILLIAM McCOMB.